United States Patent [19]
Tuma et al.

[11] 3,978,099
[45] Aug. 31, 1976

[54] SOLID ACETYLTARTARIC ACID ESTERS OF HIGH FLUIDITY IN POWDER FORM, AND PROCESS FOR THE PREPARATION THEREOF

[75] Inventors: Rudolf Tuma; Rotraud Lebender, both of Witten, Germany

[73] Assignee: Dynamit Nobel Aktiengesellschaft, Germany

[22] Filed: Apr. 2, 1974

[21] Appl. No.: 457,278

Related U.S. Application Data

[63] Continuation of Ser. No. 139,267, April 30, 1971, abandoned.

[30] Foreign Application Priority Data

May 2, 1970 Germany............................ 2021565

[52] U.S. Cl............................. 260/404.8; 426/194; 426/198
[51] Int. Cl.²....................... C09F 5/00; A23D 3/00
[58] Field of Search.................. 260/404.8; 426/198, 426/194

[56] References Cited
UNITED STATES PATENTS

| | | | |
|---|---|---|---|
| 2,938,027 | 5/1960 | Gladstone | 260/234 |
| R25,696 | 12/1964 | Houben | 99/123 |

FOREIGN PATENTS OR APPLICATIONS

| | | | |
|---|---|---|---|
| 6,614,853 | 10/1966 | Netherlands | 206/404.8 |

Primary Examiner—Winston A. Douglas
Assistant Examiner—John F. Niebling
Attorney, Agent, or Firm—Craig & Antonelli

[57] ABSTRACT

Solid acetyltartaric acid esters that have fluidity in the pulverized form. These esters are obtained from partial glycerides of mixtures of saturated $C_{14}$–$C_{22}$ fatty acids having a monoglyceride content of 57 to 63% by weight, and iodine values of below 5 and contain 0.91 to 1.8 moles of tartaric acid and 1.8 to 3.4 moles of acetic acid bound to tartaric acid, per mole of partial glyceride. Also, processes for producing these unique acid esters are disclosed.

10 Claims, No Drawings

SOLID ACETYLTARTARIC ACID ESTERS OF HIGH FLUIDITY IN POWDER FORM, AND PROCESS FOR THE PREPARATION THEREOF

This is a continuation of application Ser. No. 139,267 filed Apr. 30, 1971, now abandoned.

This invention relates to solid acetyltartaric acid esters having high fluidity when in powder form, and to a process for the production thereof.

Esters of hydroxypolycarboxylic acids or the anhydrides thereof, especially the edible acids and the aceto compounds thereof with a great variety of condensation coreactants containing alcoholic groups have been known for a long time in the literature. For example, in U.S. Pat. No. 2,236,516, a plurality of possible combinations are set forth, and a number of possible uses of such esters are disclosed, essentially in technical areas. In this connection, products are also recited which are produced by the reaction of diacetyltartaric acid anhydride with partial glycerides, for example, glycerol monostearate.

U.S. Pat. No. 2,520,139 relates to a process for the production of anhydrides of acetylated edible acids, wherein, preferably with the use of catalysts, 3.1 to 3.5 moles of acetic anhydride are employed per mole of tartaric acid. In U.S. Pat. No. 2,938,027, the reaction of acetylated edible acid anhydrides is described with partial glycerides of fatty acids having the chain length $C_{16} - C_{18}$. In this process, 2.0 to 2.9 moles of acetic anhydride are reacted per mole of tartaric acid in order to produce the acetylated edible acid anhydride. By this procedure, it is intended to obtain, on account of a certain diacetyltartaric acid proportion, a lowering of the melting point of the reaction product and final products of a higher color stability. U.S. Pat. No. 2,689,797 relates to the improvement of bread and the preparation of shortenings and discloses a plurality of additives suitable for this use. In this connection, diacetyltartaric acid esters of unsaturated and partially saturated mono- and/or partial glycerides are likewise described. U.S. Pat. No. 3,443,965 relates to combinations of diacetyltartaric acid esters of mono- and partial glycerides of vegetable oils with molecular-distilled monoglycerides of varying iodine values.

These acetyltartaric acid esters described in the patent literature have a honey-like viscous to waxy consistency. For practical use, solid acetyltartaric acid esters offer substantial advantages for the improvement of flour as well as for auxiliary baking agents (baking adjuvants). In pulverized form, such solid esters permit a more satisfactory handling and dosing than the corresponding liquid to semi-solid products. However, solid acetyltartaric acid esters in the pulverized form exhibit the disadvantage of having a strong tendency toward lumpiness. There have been a great number of attempts to overcome this disadvantage; for example, by the addition of a flowing agent. However, such attempts have not resulted in any satisfactory success.

Advantageously, in accordance with this invention, it has now been discovered that solid acetyltartaric acid esters having high fluidity in pulverized form are obtained from partial glycerides of mixtures of saturated fatty acids with a chain length of from $C_{14}$ to $C_{22}$, having a monoglyceride content of 57–63% and iodine values of below 5, when the esters contain, per mole of partial glyceride, 0.91 to 1.8 moles of tartaric acid and 1.8 to 3.4 moles of acetic acid, the acetic acid being bound to tartaric acid, e.g., in the form of monoacetyl- or diacetyl tartaric acid or anhydride. Preferably, these acid esters contain 1.3 to 1.6 moles of tartaric acid and 2.4 to 3.0 moles of acetic acid bound to tartaric acid per mole of the partial glyceride. In addition, from 0.9 to 1.7 moles of at least one aceto-substituted acid compound per mole of partial glyceride, said compound being selected from the group consisting of monoacetyltartaric acid, diacetyltartaric acid, their anhydrides, and mixtures thereof, and containing from 1.8 to 3.4 moles of acetic acid may be reacted with the partial glycerides of mixtures of saturated fatty acids with a chain length from $C_{14}$ to $C_{22}$ to produce the solid acetyltartaric acid esters according to the invention. It will be recognized that the content of tartaric acid which is not acetylized may be from 0.01 to 0.1 moles per mole of the partial glycerides.

In addition, solid acetyltartaric acid esters having high fluidity in a pulverized form may be obtained by heating one mole of a partial glyceride of saturated fatty acids of the chain length $C_{14}$ to $C_{22}$ having a monoester content of 57 to 63% by weight with iodine values of below 5, under a vacuum at 115° to 120°C., together with 0.88 – 1.5 moles of diaacetyltartaric acid anhydride and 0.03 to 0.3 mole of monoacetyltartaric acid anhydride, obtained by the reaction of 0.91 to 1.8 moles of tartaric acid anhydride as a solid mixture obtained by reaction of acid with 2.7 to 5.1 moles of acetic anhydride while maintaining the reaction mixture at this temperature whereby the chemical addition of the anhydrides to the partial ester takes place, and then processing the resulting ester to produce the solid acetyltartaric acid esters having a high fluidity in the pulverized form.

It has furthermore been found that it is of substantially no importance for the properties of the final product whether diacetyltartaric acid anhydride and tartaric acid are chemically added to the partial glyceride, or whether the corresponding amounts of diacetyltartaric acid anhydride and monoacetyltartaric acid anhydride are employed for this purpose.

In addition, it has been discovered that it is not necessary to react a solid mixture, freed of acetic acid, of diacetyltartaric acid anhydride and tartaric acid, or of diacetyltartaric acid anhydride and monoacetyltartaric acid anhydride, with the partial glyceride. In particular, a final product having the same desired properties is obtained by arranging that the withdrawing or removal of the acetic acid liberated during the anhydride formation is allowed to proceed in parallel with the chemical addition of the anhydrides to the partial ester of the fatty acids. In addition to obtaining a saving in time, this mode of operation provides a simplification of the process, insofar as it is possible to conduct the process in one and the same reaction vessel or reactor. Advantageously, it has also been found that any concomitantly occurring formation of minor amounts of aceto-esters has no effect on the fluidity and baking properties of the thus-produced emulsifiers.

The solid acetyltartaric acid esters of this invention exhibit a great advantage as baking emulsifiers in that these esters can be taken from the storage vessels in the powdered form, without any losses, they are readily dosable, and they are mixable with the flour in a uniform manner. From the baking technology viewpoint, the effect of these emulsifiers is expressed in wide fermentation tolerances, making it possible for the baker to produce qualitatively uniform, yeast-fermented baking goods with a considerable increase in volume, good pore characteristics, and satisfactory crust. After freeze storage, these baking goods again obtain the desired freshness by heating them up. A particularly advantageous effect is obtained by adding to the emulsifiers of this invention from 0.01 to 0.05% by weight of ascorbic acid based on the weight of the emulsifier.

EXAMPLE 1

In this example, various solid acetyltartaric esters were evaluated as baking emulsifiers and for their fluidity. The results were obtained in baking tests with the use of the same amounts of emulsifier (0.3 g. per 100 g. of flour) in accordance with the recited baking recipe:

|  | |
|---|---|
|  | 1,000 g. of wheat flour, type 550 |
|  | 20 g. of salt |
|  | 22 g. of sugar |
|  | 67 g. of yeast |
|  | 3 g. of emulsifier |
|  | 560 ml. of pouring water of 15–18°C. |
| Yield in dough: | 1560 cc. |
| Kneading time: | 15 minutes |
| Dough rest: | 1 × 15 min. at 27–29°C. |
| Fermentaion times: | 30, 45, 60 minutes at 31–33°C. |
| Baking time: | 18 minutes at 240°C. |

The average baking volume set forth in the following table is calculated in accordance with the "Detmold evaluation scheme."

The emulsifiers are placed in a pulverized form by grinding or other suitable measures normally conducted with the acetyltartaric acid esters of this invention, up to a grain size of below 500μ. In order to evaluate the fluidity of these emulsifiers, 1 kilogram of the powdered emulsifier is stored at room temperature as well as at 30°C.; after 72 hours, the product must still be fluid without any further mechanical treatment. This test yields a sufficient evaluation for the behavior of the esters of this invention in practice.

| Molar Ratio of Partial Glyceride (57–63% Monoester Content): Diacetyltartaric Acid Anhydride: Tartaric Acid | Baking Volume (ml/100 gm.Flour) in the Range of Fermentation Tolerance | | | Fluidity of the Ground Acetyltartaric Acid Ester |
|---|---|---|---|---|
|  | 30 Min. | 45 Min. | 60 Min. |  |
| 1 : 1 : 0 | 744 | 816 | 900 | poor |
| 1 : 1.5 : 0 | 876 | 942 | 975 | poor. |
| 1 : 1 : 0.04 | 775 | 815 | 740 | good |
| 1 : 1.5 : 0.04 | 845 | 1010 | 1050 | good |
| 1 : 2 : 0.04 | 880 | 935 | 955 | good |
| 1 : 1 : 0.1 | 810 | 890 | 925 | good |
| 1 : 1.25 : 0.1 | 834 | 924 | 996 | very good |
| 1 : 1.5 : 0.1 | 834 | 924 | 1038 | very good |
| 1 : 1.7 : 0.1 | 825 | 905 | 995 | good |
| 1 : 2 : 0.1 | 882 | 974 | 988 | poor |
| 1 : 1.25 : 0.1 (+ 0.05% of ascorbic acid) | 850 | 947 | 1020 | very good |
| 1 : 1.5 : 0.1 (+ 0.01% of ascorbic acid) | 855 | 935 | 1057 | very good |
| 1 : 1.7 : 0.1 (+ 0.05% of ascorbic acid) | 845 | 920 | 1015 | good |

EXAMPLE 2

This example further illustrates preparation of the solid acetyltartaric acids of this invention.

202 kg. (1.35 moles) of tartaric acid is added, under agitation, to 382 kg. (3.75 moles) of acetic acid anhydride, whereby the mixture assumes a temperature of about 90°C. under the influence of the thus-occurring exothermic reaction. The temperature is further increased to 118°C. by gentle heating, and the reaction mixture is refluxed under slight boiling for about one-half hour. After cooling to 85°C., there is added to the reaction mixture (which is a solution of 1.05 moles of diacetyltartaric acid anhydride and 0.3 mole of monoacetyltartaric acid anhydride in 5.1 moles of acetic acid) 478 kg. (1 mole) of a partial glyceride, liquefied at the same temperature, of the saturated fatty acids $C_{14}$–$C_{22}$, iodine value below 5, having a content of 57% of monoglyceride. Under the gradual application of a vacuum, this reaction mixture is heated to 115°–120°C. and finally the procedure is conducted at this temperature under full vacuum. During this step, the acetic acid is distilled off; and, simultaneously, the chemical addition of the di- and monoacetyltartaric acid anhydride to the partial glyceride takes place. About 2 hours after reaching the reaction temperature, the product is free of acetic acid, and the diacetyltartaric acid ester of the partial glyceride is formed. The final product was evaluated for its specific properties, and for its fluidity and usefulness as a baking emulsifier as in Example 1 and found to have the following characteristic data:

| | |
|---|---|
| Acid number | 99 |
| Saponification value | 503 |
| Hydroxyl number | 18 |
| Melting point | 48°C. |
| Fluidity of the powder: | very good |
| Baking volume (ml/100 gm.) at a fermentation time | |
| of 30 minutes: | 820 |
| of 45 minutes: | 915 |
| of 60 minutes: | 990 |

EXAMPLE 3

Analogously to the mode of operation described in Example 2, a diacetyltartaric acid ester is produced from 240 kg. (1.6 moles) of tartaric acid, 459 kg. (4.5 moles) of acetic acid anhydride, and 462 kg. (1 mole) of partial glyceride with a monoglyceride content of 63% and an iodine number below 5, wherein 1.3 moles of diacetyltartaric acid anhydride and 0.3 mole of monoacetyltartaric acid anhydride are chemically added to one mole of partial glyceride. The characteristic data of the thus-produced final product are:

| | |
|---|---|
| Acid number: | 105 |
| Saponification number: | 531 |
| Hydroxyl number: | 0 |
| Melting point: | 50°C. |
| Fluidity of powder: | very good |
| Baking volume at a fermentation time of | |
| 30 minutes: | 839 |
| 45 minutes: | 990 |
| 60 minutes: | 1032 |

EXAMPLE 4

In this example, 470 kg. (1 mole) of the partial glyceride of the saturated fatty acids $C_{14}$–$C_{22}$ having an iodine number of below 5 and a monoglyceride content of 60% is mixed, at 70°–80°C., with 367 kg. (1.7 moles) of diacetyltartaric acid anhydride and 15 kg. (0.1 mole) of tartaric acid and heated, under agitation, and under full vacuum, to 115°–120°C. After about 2 hours, the reaction is terminated and the product can be cooled. It exhibits the following characteristic data:

| | |
|---|---|
| Acid number: | 118 |
| Saponification number: | 543 |
| Hydroxyl number: | 32 |
| Melting point: | 54°C. |
| Fluidity of powder: | good |
| Baking volume at a fermentation time of | |
| 30 minutes: | 825 |
| 45 minutes: | 905 |
| 60 minutes: | 995 |

EXAMPLE 5

Another procedure for forming the esters of this invention is illustrated in this example, wherein 240 g. (1.6 moles) of tartaric acid is added, under agitation, to 459 g. (4.5 moles) of acetic anhydride, the mixture assuming a temperature of about 90°C. under the influence of the thus-occurring exothermic reaction. The temperature is increased further to 118°C. by gentle heating and the reaction mixture is maintained under reflux for about one-half hour with slight boiling. After cooling to 85°C., the main portion of the acetic acid (about 70%) is driven off under gradual increase of the vacuum. During this step, a crystalline sludge is obtained consisting of diacetyltartaric acid anhydride and monoacetyltartaric acid anhydride. In order to remove the residual acetic acid, the reaction mixture is vacuum-filtered and the crystalline mass is washed with petroleum ether. After removing the residual solvent by the application of a vacuum, 333 g. of a mixture is obtained consisting of 1.3 moles of diacetyltartaric acid anhydride and 0.3 mole of monoacetyltartaric acid anhydride. This amount is added to 462 g. (1 mole) of a partial glyceride of the saturated fatty acids $C_{14}$–$C_{22}$ molten at a temperature of 70°–80°C., having an iodine value of below 5 and a monoglyceride content of 63%, and this reaction mixture is heated under agitation under a full vacuum (i.e., 10 mm. Ng.) to 115°–120°C. After about 2 hours, the reaction is terminated, and the product can be cooled off. The product has the following characteristic data:

| | |
|---|---|
| Acid number: | 103 |
| Saponification number: | 518 |
| Hydroxyl number: | 39 |
| Melting point: | 50°C. |
| Fluidity of powder: | very good |
| Baking volume at a fermentation time of | |
| 30 minutes: | 840 |
| 45 minutes: | 987 |
| 60 minutes: | 1015 |

EXAMPLE 6

To a diacetyltartaric acid ester produced analogously to Example 4 is added 0.05% by weight of ascorbic acid (based on the weight of ester) during the grinding step.

In baking tests with the above-mentioned baking recipe, the following baking volumes (ml/100 gm. flour) are obtained when using 0.3 g. of this emulsifier per 100 g. of flour:

| At a fermentation time of: | 30 minutes: | 845 |
|---|---|---|
| | 45 minutes: | 920 |
| | 60 minutes: | 1015 |

The fluidity of the powder is good.

While the novel principles of the invention have been described, it will be understood that various omissions, modifications and changes in these principles may be made by one skilled in the art without departing from the spirit and scope of the invention.

We claim:

1. Solid pulverized acetyltartaric acid esters having fluidity in said pulverized form, said esters comprising reaction products of partial glycerides of mixtures of saturated $C_{14}$ to $C_{22}$ fatty acids having a monoglyceride content of 57 to 63% by weight, and iodine values of below 5; and containing 0.91 to 1.8 moles of tartaric acid and 1.8 to 3.4 moles of acetic acid bound to tartaric acid, per mole of partial glyceride.

2. The acetyltartaric acid esters of claim 1, in which the content of tartaric acid is from 1.3 to 1.6 moles and the content of acetic acid bound to tartaric acid is 2.4 to 3.0 moles per mole of partial glycerides.

3. A solid pulverized acetyltartaric acid ester product having high fluidity in said pulverized form, which comprises the ester reaction product of (1) a partial glyceride of at least one saturated fatty acid containing 14 to 22 carbon atoms and having a monoglyceride content of from 57 to 63% by weight, and iodine values below 5; (2) from 0.9 to 1.7 moles of at least one aceto-substituted acid substance per mole of partial glyceride, said substance being selected from the group consisting of monoacetyltartaric acid, diacetyltartaric acid, anhydrides of said acids, and mixtures thereof, and containing from 1.8 to 3.4 moles of acetic acid; and (3) from 0.01 to 0.1 moles of tartaric acid per mole of the partial glyceride.

4. A process for the preparation of solid acetyltartaric acid esters having high fluidity in a pulverized form, which comprises (1) forming a reaction mixture of a partial glyceride of saturated fatty acids of the chain length $C_{14}$–$C_{22}$ having a monoester content of 57 to 63% by weight and iodine values of below 5 with 0.9 – 1.7 moles of diacetyltartaric acid anhydride and 0.01 – 0.1 mole of tartaric acid per mole of said glyceride; (2) heating the mixture under vacuum to a reaction temperature; (3) maintaining the mixture at this temperature under vacuum to effect the desired reaction; and (4) recovering the desired ester product.

5. The process of claim 4 in which the reaction mixture is formed by mixing the partial glyceride, diacetyltartaric acid and tartaric acid at a temperature of 70° to 80°C.

6. The process of claim 5 in which the reaction mixture is heated at 115° to 120°C. under a vacuum of maximally 10 mm. Hg. for a period of 2 hours.

7. A process for the preparation of solid acetyltartaric acid esters having high fluidity in a pulverized form, which comprises (1) heating one mole of a partial glyceride of saturated fatty acids of the chain length $C_{14}$ to $C_{22}$ having a monoester content of 57 to 63% by weight with iodine values of below 5, under a vacuum at 115° to 120°C., together with 0.88 − 1.5 mole of diacetyltartaric acid anhydride and 0.03 to 0.3 mole of monoacetyltartaric acid anhydride, obtained by the reaction of 0.91 to 1.8 moles of tartaric acid anhydride as a solid mixture obtained by reaction of acid with 2.7 to 5.1 moles of acetic anhydride; (2) maintaining the reaction mixture at this temperature whereby, the chemical addition of the anhydrides to the partial glyceride takes place; and (3) processing the resulting ester to produce a desired pulverized product.

8. A process for the preparation of solid acetyltartaric acid esters having high fluidity in the pulverized form, which comprises (1) adding one mole of a partial glyceride of saturated fatty acids of the chain length $C_{14}$–$C_{22}$ having a monoester content of 57 to 63% by weight with iodine values of below 5, to an acetic solution of diacetyl- and monoacetyltartaric acid anhydride in a reactor vessel, said solution being obtained by a previous reaction of 0.91 to 1.8 moles of tartaric acid and 2.7 to 5.1 moles of acetic anhydride in the same vessel, and (2) heating the resulting reaction mixture under vacuum to effect reaction of the anhydrides and the partial glyceride and to distill off the excess acetic acid.

9. The process of claim 8 in which the reaction is heated to 115° to 120°C. under a vacuum of 10 mm. Hg. for about 2 hours.

10. The solid acetyltartaric acid esters of claim 1, wherein the acetic acid is bound to the tartaric acid in the form of monoacetyl- or diacetyltartaric acid or anhydride.

* * * * *